United States Patent
Minamimoto et al.

(10) Patent No.: US 11,588,634 B2
(45) Date of Patent: Feb. 21, 2023

(54) STORAGE DEVICE AND CONTROLLING METHOD

(71) Applicant: KIOXIA CORPORATION, Tokyo (JP)

(72) Inventors: Takeyuki Minamimoto, Tokyo (JP); Taichi Ejiri, Yokohama Kanagawa (JP); Teruji Yamakawa, Tokyo (JP)

(73) Assignee: Kioxia Corporation, Tokyo (JP)

( * ) Notice: Subject to any disclaimer, the term of this patent is extended or adjusted under 35 U.S.C. 154(b) by 224 days.

(21) Appl. No.: 17/003,783

(22) Filed: Aug. 26, 2020

(65) Prior Publication Data
US 2021/0297248 A1 Sep. 23, 2021

(30) Foreign Application Priority Data

Mar. 18, 2020 (JP) .............................. JP2020-047740

(51) Int. Cl.
*H04L 9/08* (2006.01)
*H04L 9/14* (2006.01)
*G06F 3/06* (2006.01)

(52) U.S. Cl.
CPC .......... *H04L 9/0894* (2013.01); *G06F 3/0623* (2013.01); *G06F 3/0652* (2013.01); *G06F 3/0679* (2013.01); *H04L 9/0891* (2013.01); *H04L 9/14* (2013.01)

(58) Field of Classification Search
CPC ....... H04L 9/0894; H04L 9/0891; H04L 9/14; G06F 3/0623; G06F 3/0652; G06F 3/0679

USPC ......................................................... 713/193
See application file for complete search history.

(56) References Cited

U.S. PATENT DOCUMENTS

| | | | |
|---|---|---|---|
| 8,291,226 B2 | 10/2012 | Chun et al. | |
| 2010/0138652 A1 | 6/2010 | Sela et al. | |
| 2012/0093318 A1* | 4/2012 | Obukhov ............ | G06F 21/6209 726/33 |
| 2015/0365232 A1* | 12/2015 | Yang .................... | G06F 21/6254 380/286 |
| 2017/0337390 A1* | 11/2017 | Hamilton ............... | H04L 9/0861 |
| 2019/0018972 A1 | 1/2019 | Xu et al. | |
| 2019/0294826 A1* | 9/2019 | Obara .................... | H04L 9/3242 |
| 2021/0075607 A1* | 3/2021 | Li .......................... | H04L 9/0894 |

* cited by examiner

*Primary Examiner* — Kambiz Zand
*Assistant Examiner* — Phuc Pham
(74) *Attorney, Agent, or Firm* — Kim & Stewart LLP (57) ABSTRACT

A storage device includes a first memory to which data can be written a plurality of times and a second memory that includes storage elements for which electrical characteristics can be changed only once. The first memory storing first encryption key information and the second memory storing second encryption key information. A controller generated an encryption key using the first encryption key information and the second encryption key information in combination and then encrypts and decrypts data written or read from the first memory. When a host requests an encryption erase, the controller attempts to erase the first encryption key information from the first memory. If the requested erase fails, the controller erases the second encryption key information from the second nonvolatile memory.

20 Claims, 7 Drawing Sheets

FIRST NONVOLATILE MEMORY

FIG. 2B

SECOND NONVOLATILE MEMORY

STORAGE DEVICE AND CONTROLLING METHOD

CROSS-REFERENCE TO RELATED APPLICATION(S)

This application is based upon and claims the benefit of priority from Japanese Patent Application No. 2020-047740, filed Mar. 18, 2020, the entire contents of which are incorporated herein by reference.

FIELD

Embodiments described herein relate generally to a technique for controlling a storage device including a nonvolatile memory.

BACKGROUND

In recent years, storage devices incorporating a nonvolatile memory have become widespread. As one of such storage device, a solid state drive (SSD) including a NAND flash memory is known.

The storage device may have a function of automatically encrypting user data to be stored (referred to as a self-encryption function in some contexts) in order to prevent leakage of data. The storage device having a self-encryption function is also called a self-encrypting drive (SED).

A SED erases information for generating the storage encryption key (encryption key generation information) according to an encryption erasure request (this is referred to as a cryptographic erase in some contexts). As a result, certain measures that might be taken to decrypt the encrypted user data is fail, and thus data leakage can be prevented.

However, in some cases, the storage encryption key generation information may not be erased due to wearing-out of the storage device. If this occurs, the encrypted user data can still be decrypted, and data leakage cannot be prevented.

DETAILED DESCRIPTION

Certain example embodiments provide a storage device and a method of controlling a storage device for preventing data leakage even when the storage device wears out.

In general, according to one embodiment, a storage device includes a first nonvolatile memory to which data can be written a plurality of times. The first nonvolatile memory is configured to store first encryption key generation information. The storage device additionally includes a second nonvolatile memory that includes storage elements for which electrical characteristics can be changed only once. The second nonvolatile memory is configured to store second encryption key generation information. A controller of the storage device is configured to: generate an encryption key using the first encryption key generation information and the second encryption key generation information in combination; encrypt data to be written to the first nonvolatile memory using the generated encryption key; decrypt data read from the first nonvolatile memory using the generated encryption key; attempt an erase of the first encryption key generation information in the first nonvolatile memory when a host requests an encryption erase; and erase the second encryption key generation information in the second nonvolatile memory if the attempt to erase first encryption key generation information fails.

Hereinafter, example embodiments of the present disclosure are described with reference to the drawings.

First Embodiment

Figure 1:
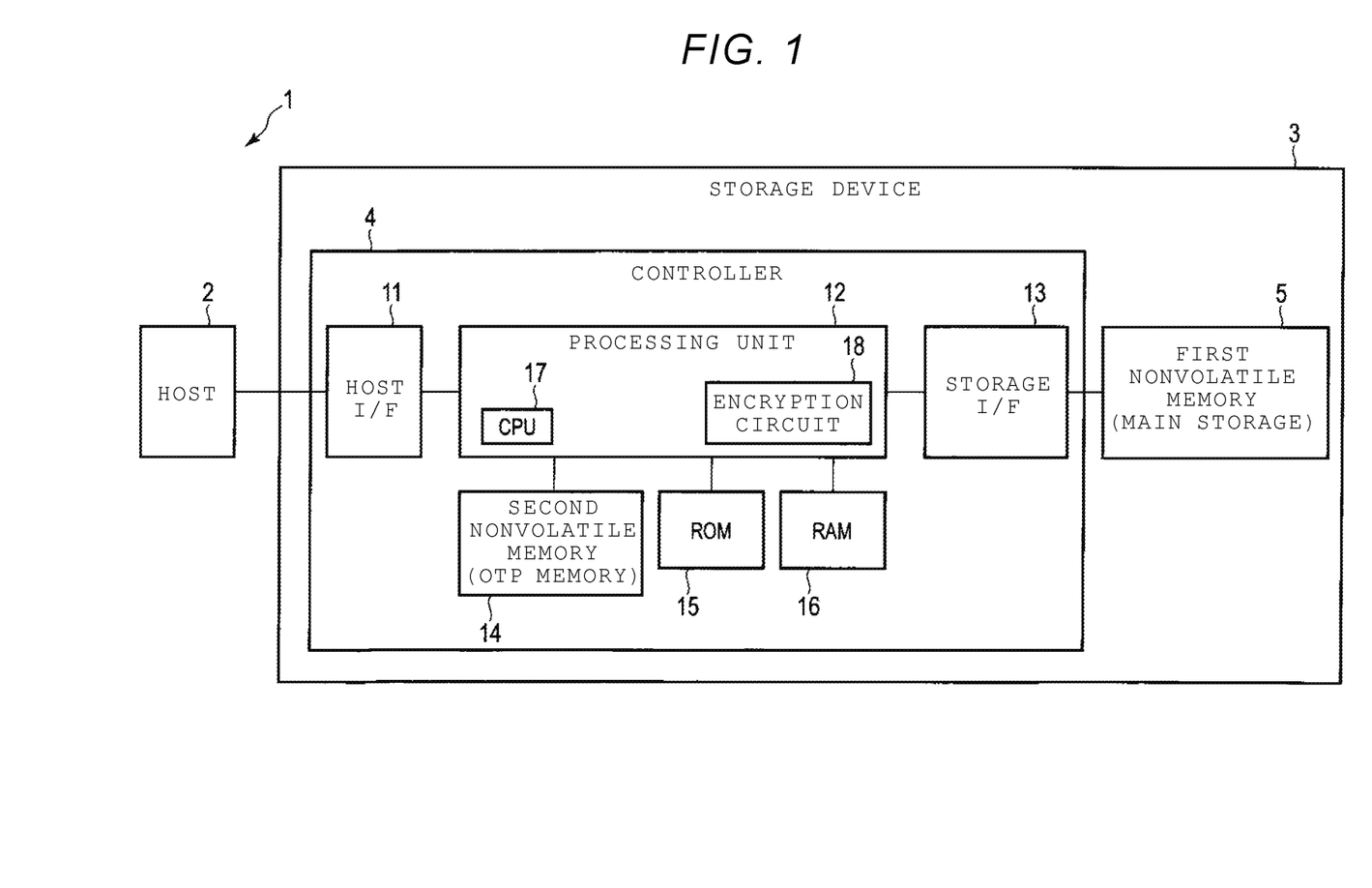
FIG. 1 is a block diagram illustrating a configuration example of an information processing system including a storage device according to a first embodiment.

FIG. 1 is a block diagram illustrating a configuration example of an information processing system 1 including a storage device according to a first embodiment. The information processing system 1 includes a host device 2 (hereinafter, also referred to as a host 2) and a storage device 3.

The host 2 may be a personal computer, a server, a mobile phone, or an imaging device. The host 2 may be a mobile terminal, such as a tablet or a smartphone, or may be an in-vehicle terminal, such as a car navigation system.

The storage device 3 is configured to write data to the storage and read data from the storage. For example, the storage device 3 may be a solid state drive (SSD) or a hard disk drive (HDD). In the following, an example in which the storage device 3 is an SSD will be described. The storage device 3 has a function of automatically encrypting user data to be stored in the storage (a self-encrypting function) in order to prevent leakage of the data or the like. That is, the storage device 3 is a self-encrypting drive (SED). The storage device 3 is based on, for example, the Trusted Computing Group (TCG) standard and has a self-encryption function defined by the TCG standard. In the TCG standard, data encryption and access control is managed on a storage sub-area (range) basis. The storage device 3 can function as an external storage device of the host 2, which is an information processing device outside the storage device 3. The storage device 3 may be connected to the host 2 via a cable or a network.

As an interface for interconnecting the host 2 and the storage device 3, SCSI, Serial Attached SCSI (SAS), ATA, Serial ATA (SATA), PCI Express® (PCIe), Ethernet®, Fibre channel, NVM Express® (NVMe), and the like may be used.

The storage device 3 includes a first nonvolatile memory 5 and a controller 4.

The first nonvolatile memory 5 is a storage of the storage device 3. The first nonvolatile memory 5 includes a plurality of storage elements (or memory cells). Data can be written to the storage elements in the first nonvolatile memory 5 a plurality of times. The first nonvolatile memory 5 is, for example, a NAND flash memory or a NOR flash memory. The first nonvolatile memory 5 may include a plurality of NAND flash memory chips or may include a plurality of NOR flash memory chips.

The controller 4 is a memory controller that controls the first nonvolatile memory 5. For example, the controller 4 is a circuit such as a System-on-a-chip (SoC). The controller 4 is communicatively connected to the first nonvolatile memory 5.

The controller 4 includes a host interface (host I/F) 11, a processing unit 12, a storage interface (storage I/F) 13, a second nonvolatile memory 14, a read only memory (ROM) 15, a random access memory (RAM) 16, and the like.

The host I/F 11 is a hardware interface for a communication between the storage device 3 and an external information processing device. Examples of a command received from the outside include, for example, a write command, a read command, or a command for cryptographic erase (hereinafter, also referred to as a cryptographic erase command).

The cryptographic erase command is a command for requesting erase or change of an encryption key used for encryption and decryption of the user data. The cryptographic erase command can be specified by various interface standards for interconnecting the host 2 and the storage device 3. For example, in NVMe, a Sanitize command, a Format NVM command, or the like can be used as the cryptographic erase command.

The processing unit 12 is a processing circuit such as SoC. The processing unit 12 processes a command received via the host I/F 11.

The storage I/F 13 is a hardware interface for a communication between the storage device 3 and the first nonvolatile memory 5. The storage I/F 13 may be connected to a plurality of memory chips in the first nonvolatile memory 5 via a plurality of channels.

The second nonvolatile memory 14 is a One-Time Programmable memory (OTP memory). For example, an electronic fuse (e-Fuse) is used in the second nonvolatile memory 14. The second nonvolatile memory 14 includes a plurality of storage elements (memory cells). However, the storage element of the second nonvolatile memory 14 is an irreversible storage element for which electrical characteristics can be changed only once.

The ROM 15 stores a program or data used in the storage device 3. The ROM 15 stores, for example, initial program load (IPL). The IPL is a program that is executed at the time of starting up the storage device 3.

The RAM 16 is used as a temporary storage area for data used in the storage device 3. The RAM 16 temporarily stores firmware and system data loaded from the first nonvolatile memory 5, user data to be written to the first nonvolatile memory 5, user data read from the first nonvolatile memory 5, and the like.

The processing unit 12 includes a central processing unit (CPU) 17 and an encryption circuit 18.

The CPU 17 is a processor configured to control operations of each unit in the controller 4. The CPU 17 has a function for managing an encryption key. For example, the CPU 17 generates, updates, and erases encryption key generation information for generating an encryption key. The encryption key generation information is data used by the CPU 17 to generate an encryption key. In this example, the encryption key generation information is a data string in which binary bits (1 or 0) are arranged. According to the content of the encryption key generation information, the encryption key generated by the CPU 17 changes. The CPU 17 generates the encryption key by using a plurality of pieces of encryption key generation information. The CPU 17 stores the generated encryption key in a register of the encryption circuit 18.

The encryption circuit 18 encrypts or decrypts data. The encryption circuit 18 encrypts user data to be written to the first nonvolatile memory 5. The encryption circuit 18 decrypts the user data read from the first nonvolatile memory 5. The encryption circuit 18 encrypts or decrypts the user data by using the encryption key stored in the register.

Figure 2A:
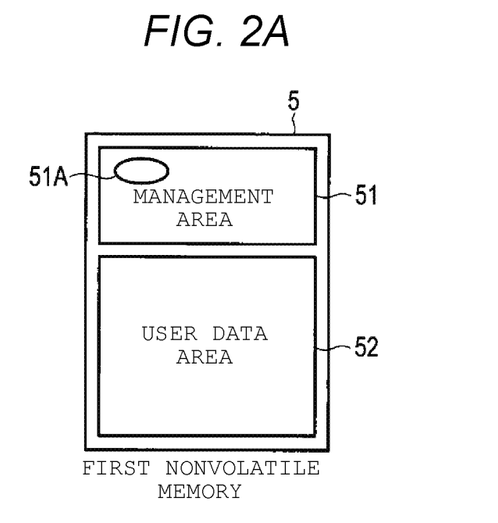
FIGS. 2A and 2B are diagrams illustrating areas in the storage device in which encryption key generation information can be stored according to a first embodiment.

FIG. 2A is a diagram illustrating an example of an area in the storage device 3 in which encryption key generation information is stored according to the first embodiment.

As illustrated in FIG. 2A, the first nonvolatile memory 5 includes a management area 51 and a user data area 52. The system data can be stored in the management area 51. The user data can be stored in the user data area 52.

First encryption key generation information 51A can be stored in the management area 51. The first encryption key generation information 51A is one of the plurality of pieces of encryption key generation information used by the CPU 17 to generate an encryption key. The first encryption key generation information 51A can be stored in the management area 51 during the manufacturing of the storage device 3. The first encryption key generation information 51A may be stored in the management area 51 when a range to be used by the user in the user data area 52 is set.

The first encryption key generation information 51A can be updated according to the cryptographic erase command received from the host 2. More specifically, according to the update, the first encryption key generation information 51A is erased from the management area 51 and new encryption key generation information is stored in the management area 51. The new encryption key generation information corresponds to third encryption key generation information 51B described below.

As such, during manufacturing or setting a range in the user data area 52 or on a subsequent update basis, one piece of encryption key generation information (for example, the first encryption key generation information 51A or the third encryption key generation information 51B) is stored in the management area 51. The CPU 17 can read the encryption key generation information stored in the management area 51 when the encryption key is generated and use the encryption key generation information for the generation of an encryption key.

Figure 2B:
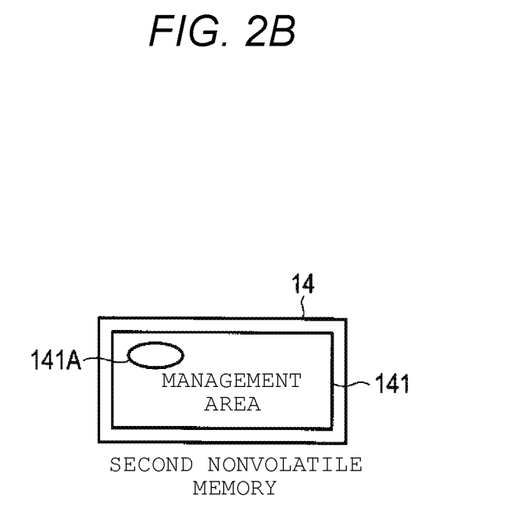

FIG. 2B is a diagram illustrating an example of an area in the storage device 3 in which another piece of encryption key generation information is stored according to the first embodiment.

As illustrated in FIG. 2B, the second nonvolatile memory 14 includes a management area 141. A second encryption key generation information 141A is stored in the management area 141. The second encryption key generation information 141A is another one of a plurality of pieces of encryption key generation information used by the CPU 17 for the generation of the encryption key. The second encryption key generation information 141A is stored in the management area 141 during the manufacturing of the storage device 3.

As such, two different pieces of the encryption key generation information (51A and 141A) are stored in the first nonvolatile memory 5 and the second nonvolatile memory 14, respectively. Accordingly, it can be said that these two pieces of the encryption key generation information (51A and 141A) are stored in two different recording media, each having different properties, respectively.

The two pieces of the encryption key generation information 51A and 141A are used for the generation of the encryption key. That is, the CPU 17 uses the first encryption key generation information 51A and the second encryption key generation information 141A to generate the encryption key. The CPU 17 stores the generated encryption key in the register of the encryption circuit 18.

The generated encryption key may be erased or changed in order to prevent leakage of the user data stored in the first nonvolatile memory 5. If the encryption key used when the user data is written to the first nonvolatile memory 5 is erased or changed to another encryption key, no one can decrypt (restore) the encrypted user data stored in the first nonvolatile memory 5 (that is, cryptographic erase is realized). Therefore, the leakage of the user data can be prevented.

One method of changing the encryption key is a method of changing the first encryption key generation information 51A in the first nonvolatile memory 5 based on a received cryptographic erase command. Another, different encryption key can be generated by changing the first encryption key generation information 51A. More specifically, the encryption key generated by using the second encryption key generation information 141A and the changed first encryption key generation information 51A is different from an encryption key generated by using the second encryption key generation information 141A and the first, original encryption key generation information 51A before the change. Accordingly, the encryption key is use can be changed by changing the first encryption key generation information 51A.

However, when the first nonvolatile memory 5 enters a state in which the data can no longer be erased/changed/overwritten, the first encryption key generation information 51A cannot be changed. For example, with respect to the SSD, when the NAND flash memory wears out, and data cannot be written to the NAND flash memory or data in the NAND flash memory cannot be erased, the first encryption key generation information 51A cannot be changed. According to the state in which the NAND flash memory wears out, when the SSD is set to a read only mode, even if the cryptographic erase command is received, it is likely that the first encryption key generation information 51A cannot be changed. In this context, a read only mode is a mode in which data can be only read from the SSD rather than written and read.

The already stored encryption key can still be generated/used. That is, the encrypted user data stored in the first nonvolatile memory 5 is in a decryptable state since necessary encryption key is still stored (readable). Therefore, the user data is likely to be leaked.

However, in this embodiment, when the first encryption key generation information 51A in the first nonvolatile memory 5 cannot be erased, the second encryption key generation information 141A in the second nonvolatile memory 14 can be erased. If the second encryption key generation information 141A is erased, no one can generate the necessary encryption key. That is, no one can decrypt (restore) the encrypted user data stored in the first nonvolatile memory 5 (that is, the cryptographic erase is realized). Therefore, if either one of the first encryption key generation information 51A or the second encryption key generation information 141A can be erased to prevent generation of the necessary encryption key, the likelihood that the user data can be securely erased may increase as compared with a case where only the first encryption key generation information 51A is necessary to generate the encryption key. Accordingly, even if the storage wears out, the leakage of the data can be prevented.

Figure 3:
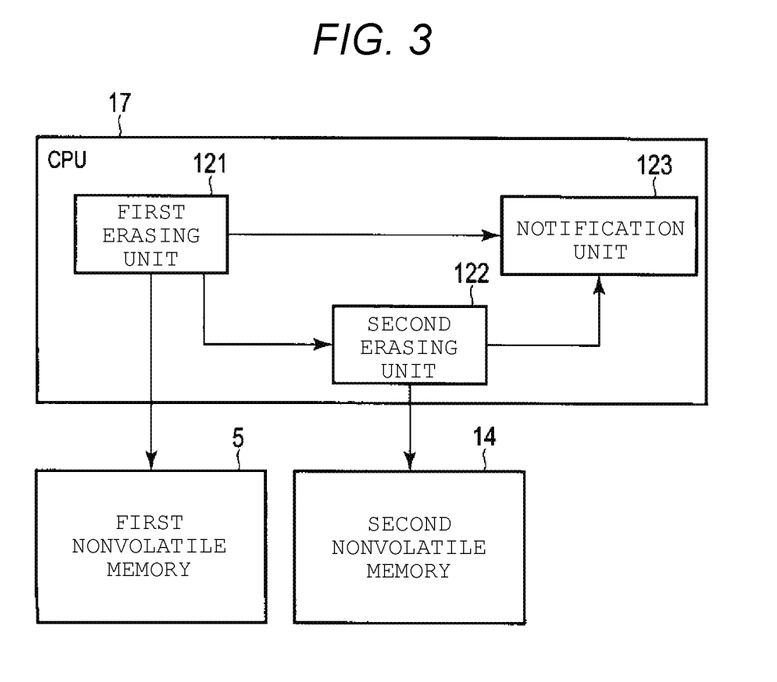
FIG. 3 is a block diagram of a storage device according to a first embodiment.

FIG. 3 is a block diagram illustrating a functional configuration example of the storage device 3 according to the first embodiment.

The CPU 17 provides a first erasing unit 121, a second erasing unit 122, and a notification unit 123. For example, the CPU 17 realizes functions of these units by executing a program such as a firmware.

When the cryptographic erase command is received, the first erasing unit 121 performs a process for erasing the first encryption key generation information 51A in the first nonvolatile memory 5 (hereinafter, referred to as a first process). In this first process, the first erasing unit 121 performs the following operations: (1) Erasing the first encryption key generation information 51A in the first nonvolatile memory 5; (2) Generating new encryption key generation information 51B; and (3) Storing the new encryption key generation information 51B in the first nonvolatile memory 5.

According to the first process, the first encryption key generation information 51A stored in the first nonvolatile memory 5 is substituted with another piece of the encryption key generation information 51B.

When the first process succeeds, the first erasing unit 121 notifies the notification unit 123 of the success of the first process. When the first process fails, the first erasing unit 121 notifies the second erasing unit 122 and the notification unit 123 of the failure of the first process.

When the first process fails, the second erasing unit 122 performs a process for erasing the second encryption key generation information 141A in the second nonvolatile memory 14 (hereinafter, referred to as a second process).

In this second process, the erasure of the second encryption key generation information 141A can be substantially realized by preventing the reading of the second encryption key generation information 141A stored in the second nonvolatile memory 14.

As noted above, the storage element of the second nonvolatile memory 14 is an irreversible storage element of which the electrical characteristics can be changed only once. Accordingly, the second nonvolatile memory 14 can include a storage element in a state in which the electrical characteristics can be still changed (hereinafter, referred to as a 0th state) and a storage element in a state in which the electrical characteristics cannot be changed any more (hereinafter, referred to as a first state). A storage element in its initial state is in the 0th state.

It can be interpreted that either the storage element in the 0th state or the storage element in the first state indicates one bit data of a "0" value. Then, the other state indicates one bit data of a "1" value. In the following, an example in which the storage element in the 0th state is considered to store one bit data of a "0" value, and the storage element in the first state stores one bit data of a "1" value.

The second encryption key generation information 141A is a data string configured with multiple binary bits. Each of the storage elements in the second nonvolatile memory 14 corresponds to data of one bit, respectively. The second nonvolatile memory 14 stores the data according to the arrangement storage elements in the 0th state and the storage elements in the first state. More specifically, the storage element corresponding to one bit data of "0" in the data string is in the 0th state. The storage element corresponding to one bit data of "1" in the data string is the first state.

In the second process, the second erasing unit 122 causes all of the storage elements in the second nonvolatile memory 14 to be in the first state. That is, the second erasing unit 122 causes each of the storage elements in the 0th state to transition to the first state. Accordingly, all of the storage elements in the second nonvolatile memory 14 are in the first state. Since all of storage elements in the first state indicate bits of data of "1" value, the data string is now merely a string of "1" values. Therefore, the second encryption key generation information 141A cannot be read from the second nonvolatile memory 14. That is, if all storage elements in the second nonvolatile memory 14 are in the first state, the erasure of the second encryption key generation information 141A is realized and, more particularly, realized in an irreversible physical manner. When the second process succeeds, the second erasing unit 122 notifies the notification unit 123 of the success of the second process. When the second process fails, the second erasing unit 122 notifies the notification unit 123 of the failure of the second process.

The notification unit 123 notifies the host 2 of at least one of the success of the first process, the failure of the first process, the success of the second process, or the failure of the second process via the host I/F 11. More specifically, when the first erasing unit 121 notifies of the success of the first process, the notification unit 123 notifies the host 2 that the first encryption key generation information 51A in the first nonvolatile memory 5 is erased. When the second erasing unit 122 notifies the success of the second process, the notification unit 123 notifies the host 2 that the second encryption key generation information 141A in the second nonvolatile memory 14 is erased. When the second erasing unit 122 notifies of the failure of the second process, the notification unit 123 notifies the host 2 that the second encryption key generation information 141A in the second nonvolatile memory 14 is not erased. Otherwise, after the first erasing unit 121 notifies of the failure of the first process, when the second erasing unit 122 notifies of the failure of the second process, the notification unit 123 may notify the host 2 that none of the first encryption key generation information 51A in the first nonvolatile memory 5 and the second encryption key generation information 141A in the second nonvolatile memory 14 has been erased.

When the first erasing unit 121 notifies of the failure of the first process, the notification unit 123 may notify the host 2 that the first encryption key generation information 51A in the first nonvolatile memory 5 is not yet erased. Here, when the permission for the second process is obtained from the host 2, the second erasing unit 122 may perform the second process.

Figure 4:
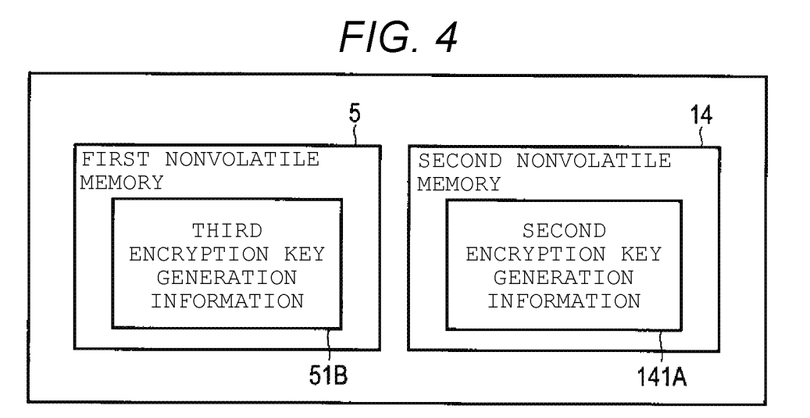
FIG. 4 is a diagram illustrating an example in which first encryption key generation information in a first nonvolatile memory is erased by the storage device according to a first embodiment.

FIG. 4 is a block diagram illustrating states of the first nonvolatile memory 5 and the second nonvolatile memory 14 when the first process according to the first embodiment succeeds. When the first process succeeds, the first encryption key generation information 51A stored in the first nonvolatile memory 5 is erased, the third encryption key generation information 51B is stored in the first nonvolatile memory 5 (more specifically, the management area 51).

Figure 5:
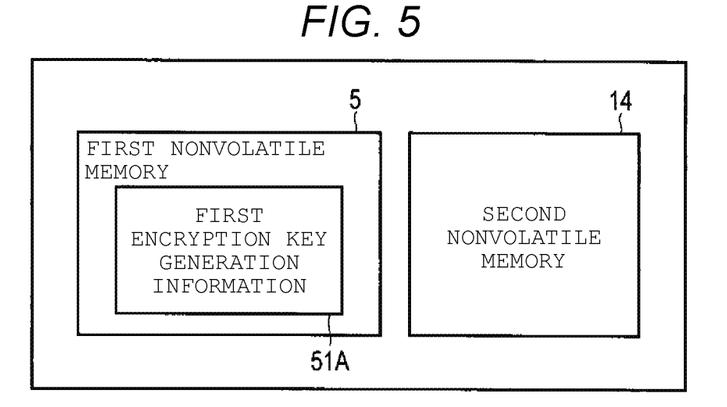
FIG. 5 is a diagram illustrating states of a first nonvolatile memory and a second nonvolatile memory (e.g., a One-Time Programmable (OTP) memory) when a second process succeeds after a first process has failed according to a first embodiment.

FIG. 5 is a block diagram illustrating states of the first nonvolatile memory 5 and the second nonvolatile memory 14 when the second process succeeds after the first process failed according to the first embodiment. When the second process succeeds after the first process failed, the second encryption key generation information 141A stored in the second nonvolatile memory 14 is erased.

Figure 6:
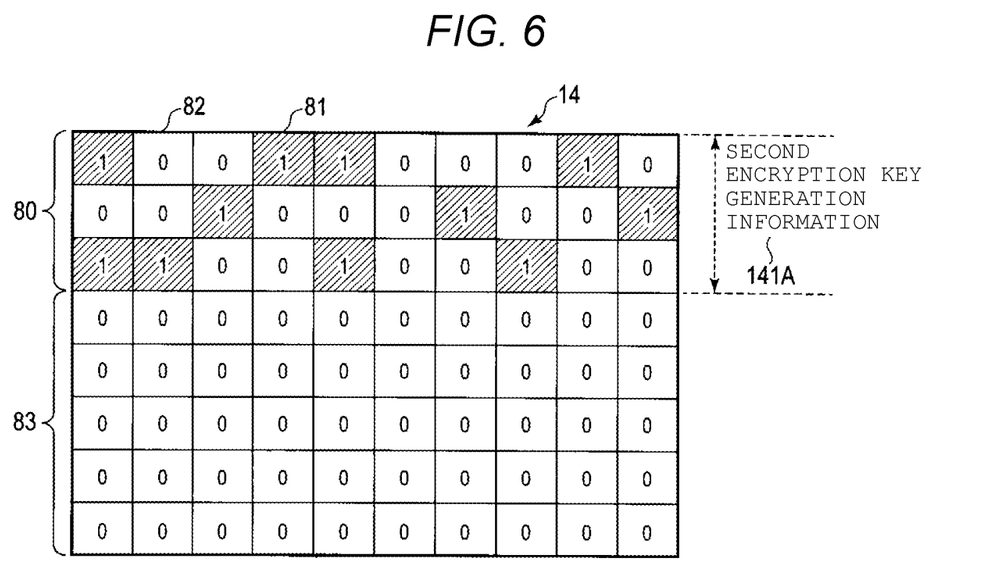
FIG. 6 is a diagram illustrating an example in which second encryption key generation information is stored in a second nonvolatile memory in the storage device according to a first embodiment.
Figure 7:
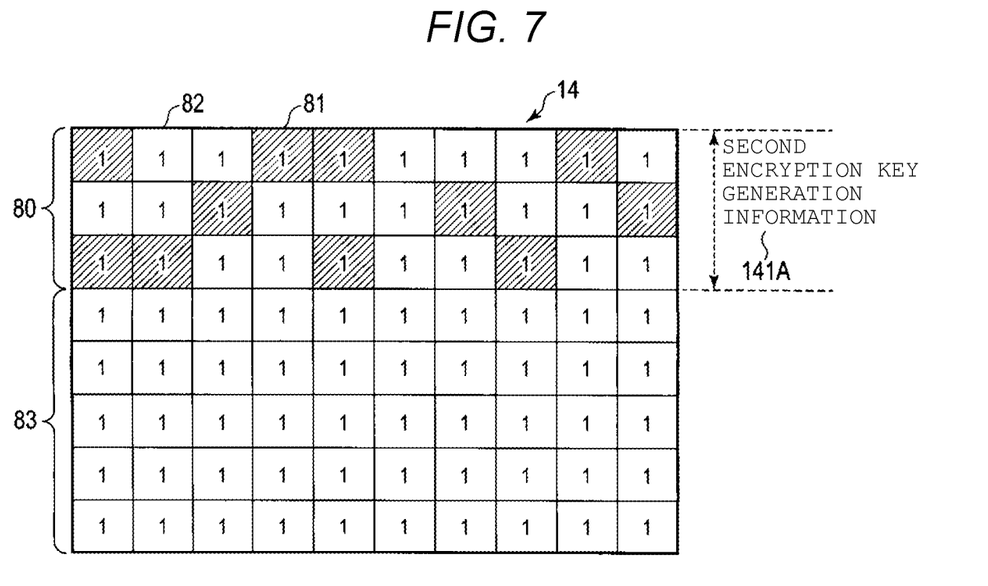
FIG. 7 is a diagram illustrating an example in which second encryption key generation information is erased in a storage device according to a first embodiment.

FIGS. 6 and 7 are diagrams illustrating examples for more specifically describing the erasure of the second encryption key generation information 141A in the second nonvolatile memory 14.

FIG. 6 is a diagram illustrating an example in which the second encryption key generation information 141A is stored in the second nonvolatile memory 14 in the storage device according to the first embodiment. A frames (boxes) shown in FIG. 6 each correspond to a storage element of the second nonvolatile memory 14. The numerical value in each frame indicates that the corresponding storage element is in the 0th state or the first state. That is, if the numerical value in the frame is "0", this indicates that the corresponding storage element is in the 0th state. If the numerical value in the frame is "1", this indicates that the corresponding storage element is in the first state.

The second encryption key generation information 141A is a data string of multiple bits. In the second nonvolatile memory 14, storage elements 82 (each corresponding to one bit data of "0") in this data string are in the 0th state. In the second nonvolatile memory 14, storage elements 81 (each corresponding to one bit data of "1") in this data string are in the first state.

The CPU 17 is configured to read one bit data of "1" from the storage element in the first state. The CPU 17 is configured to read one bit data of "0" from the storage element in the 0th state. That is, the CPU 17 deals with the storage element in the first state as a storage element to which one bit data of "1" was written. The CPU 17 deals with the storage element in the 0th state as a storage element to which one bit data of "0" was written.

The CPU 17 writes with the bits of the data string of the second encryption key generation information 141A to a plurality of storage elements 80 in the second nonvolatile memory 14. More specifically, the CPU 17 assigns each of the plurality of storage elements 80 as a write destination for one bit data according to an order of bits in the data string.

The CPU 17 causes the storage elements 81 assigned in relation to one bit data of "1" to transition from the 0th state to the first state. Specifically, the CPU 17 applies a writing voltage to this storage element 81.

The CPU 17 does not perform any operation on the storage elements 82 assigned in relation to one bit data of "0". Specifically, the CPU 17 does not apply the writing voltage to this storage element 82. Accordingly, the storage element 82 remains in the 0th state without change.

Any storage element that transitions to the first state cannot return to the 0th state. That is, the storage element 81 that transitions to the first state for writing one bit data of "1" cannot later return to the 0th state.

As illustrated in FIG. 6, the second encryption key generation information 141A is stored in the storage element group 80 in the second nonvolatile memory 14. In the storage element group 80 storing the second encryption key generation information 141A, each of the storage element group 81 is in the first state. That is, each of the storage element group 81 stores one bit data of "1". Each of the storage element group 82 in the storage element group 80 is in the 0th state. That is, each of the storage element group 82 stores one bit data of "0". Each of another group of storage elements 83 that is not presently being used for storing the second encryption key generation information 141A is in the 0th state. That is, each of the group of the storage elements 83 stores one bit data of "0".

FIG. 7 is a diagram illustrating an example in which the second encryption key generation information 141A illustrated in FIG. 6 is erased in the storage device 3 according to the first embodiment. The second erasing unit 122 causes each of the group of the storage elements 82 and 83 in the second nonvolatile memory 14 to transition from the 0th state to the first state. More specifically, the second erasing unit 122 applies the writing voltage in relation to each of the storage element groups 82 and 83 in the second nonvolatile memory 14. Accordingly, each of the storage element groups 82 and 83 transitions to the first state.

In the example illustrated in FIG. 7, each of the storage element groups 82 and 83 that is in the 0th state in the example illustrated in FIG. 6 transitions to the first state. Accordingly, each of the storage element group 82 changes from the state of storing one bit data of "0" to the state of storing one bit data of "1".

Accordingly, the data string read from the storage element group 80 used for storing the second encryption key generation information 141A becomes a data string in which all bits are data of "1". Therefore, the CPU 17 cannot read the second encryption key generation information 141A from the second nonvolatile memory 14. Accordingly, it can be said that the second encryption key generation information 141A is erased from the second nonvolatile memory 14.

In order to prevent the reading of the second encryption key generation information 141A from the second nonvolatile memory 14, one or more in the storage element group 82 in the 0th state which is in the storage element group 80 used for storing the second encryption key generation information 141A may transition to the first state. Accordingly, it is desirable that storage elements more than just those being used for storing the second encryption key generation information 141A in the 0th state in the second nonvolatile memory 14 to transition to the first state. By this process, the second encryption key generation information 141A can be prevented from being easily inferred from data read from the second nonvolatile memory 14.

As described above, the storage device 3 according to the first embodiment erases the second encryption key generation information 141A in the second nonvolatile memory 14 even if the erasure of the first encryption key generation information 51A in the first nonvolatile memory 5 failed. Accordingly, even when the first nonvolatile memory 5 wears out, the leakage of the data in the first nonvolatile memory 5 can be prevented.

Figure 8:
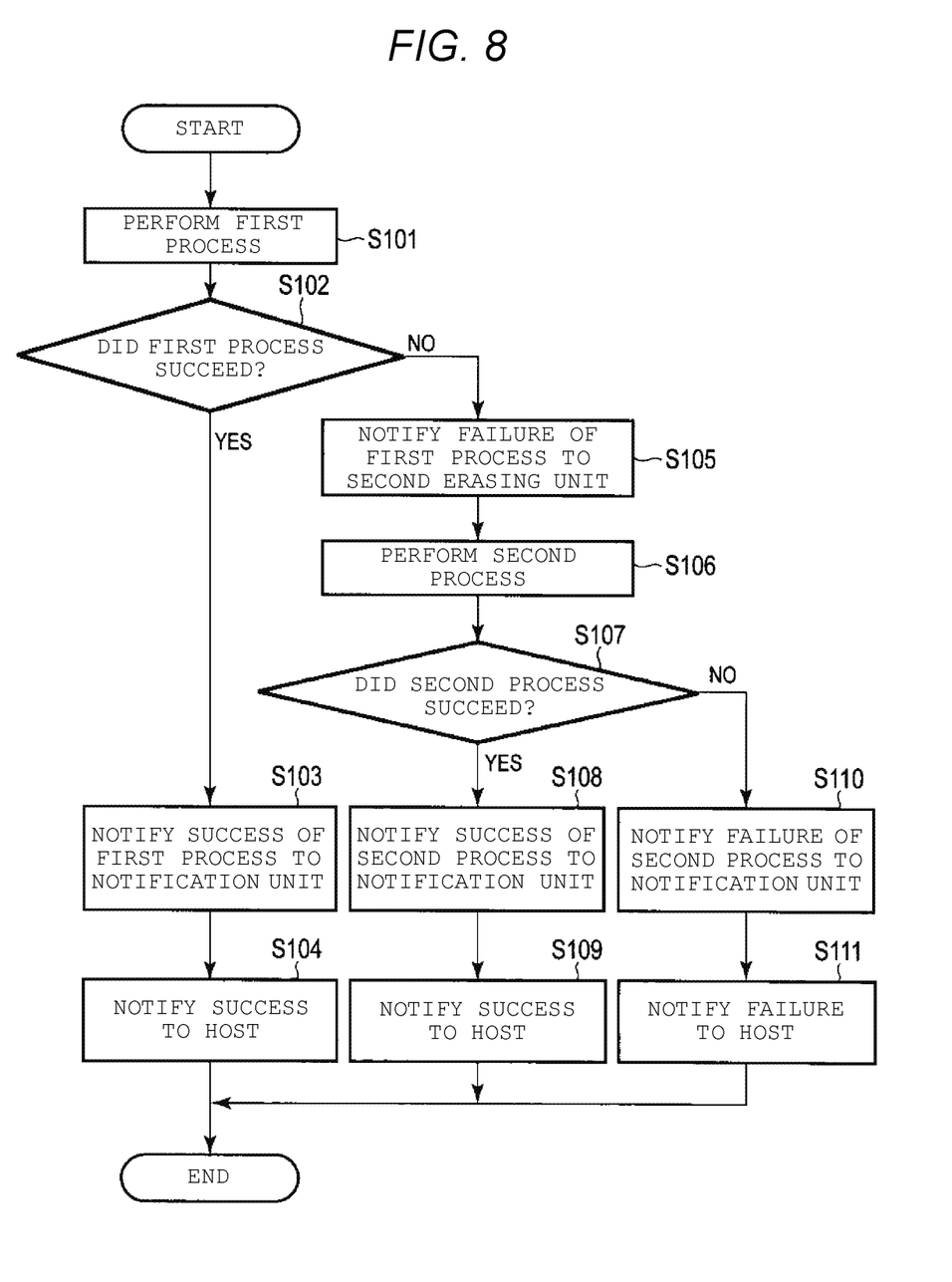
FIG. 8 is a flowchart of a first cryptographic erase process executed by a CPU in a storage device according to a first embodiment.

FIG. 8 is a flowchart illustrating an example of a procedure of a first cryptographic erase process executed by the CPU 17 in the storage device 3 according to the first embodiment.

When cryptographic erase is requested (START), the first erasing unit 121 performs the first process (S101). The first erasing unit 121 determines whether the first process succeeds (S102).

When the first process succeeds (YES in S102), the first erasing unit 121 notifies the notification unit 123 that the first process succeeds (S103). According to this notification, the notification unit 123 notifies the host 2 that the erasure of the first encryption key generation information 51A succeeds (S104), and the first cryptographic erase process of FIG. 8 ends (END).

When the first process failed (NO in S102), the first erasing unit 121 notifies the second erasing unit 122 that the first process failed (S105). The second erasing unit 122 of the CPU 17 performs the second process according to this notification of first process failure (S106). The second erasing unit 122 then determines whether the second process succeeds (S107).

When the second process succeeds (YES in S107), the second erasing unit 122 notifies the notification unit 123 that the second process succeeds (S108). According to this notification, the notification unit 123 notifies the host 2 that the erasure of the second encryption key generation information 141A succeeds (S109), the first cryptographic erase process of FIG. 8 ends (END).

When the second process fails (NO in S107), the second erasing unit 122 notifies the notification unit 123 that the second process failed (S110). According to this notification, the notification unit 123 notifies the host 2 that the erasure of the second encryption key generation information 141A failed (S111), the first cryptographic erase process of FIG. 8 ends (END).

According to the first cryptographic erase process illustrated in FIG. 8, the CPU 17 performs the first process according to the request of the cryptographic erase from the host 2. The CPU 17 directly performs the second process if the first process failed. Accordingly, even when the erasure of the first encryption key generation information 51A in the first nonvolatile memory 5 fails, the second encryption key generation information 141A in the second nonvolatile memory 14 can be erased. Accordingly, the leakage of the data in the first nonvolatile memory 5 can be prevented.

Since the CPU 17 at least notifies the host 2 of the success of the first process, the success of the second process or the failure of the second process, the user can determine to deal with the storage device 3 further based on this notification. For example, when the first process succeeds, the user can determine whether the storage device 3 can be reused. When the second process succeeds, the user can determine that the storage device 3 can be discarded. When the second process fails, the user can determine that the storage device 3 needs to be physically broken before discarding to render the device incapable of reuse or recovery.

Second Embodiment

In the first embodiment, the first process is performed based on the cryptographic erase command received from the host 2. Then, when the first process fails, the second process is performed.

In contrast, in the second embodiment, only the first process is performed based on a first cryptographic erase command received from the host 2. In the second embodiment, the second process is performed based on a second cryptographic erase command being received from the host 2.

The configuration of the storage device 3 according to the second embodiment is otherwise the same as the storage device 3 of the first embodiment. Hereinafter, differences from the first embodiment are mainly described.

The first erasing unit 121 performs the first process according to the reception of the first cryptographic erase command from the host 2. The first cryptographic erase command is a command for requesting erase of the first encryption key generation information 51A in the first nonvolatile memory 5. Details of this first process are substantially similarly to those as described in the first embodiment. When the first process succeeds, the first erasing unit 121 notifies the notification unit 123 of the success of the first process. If the first process fails, the first erasing unit 121 then notifies the notification unit 123 of the failure of the first process.

The second erasing unit 122 performs the second process according to the reception of a second cryptographic erase command from the host 2. The second cryptographic erase command is a command for requesting erase of the second encryption key generation information 141A in the second nonvolatile memory 14. Details of the second process are substantially similar to those as described in the first embodiment. When the second process succeeds, the second erasing unit 122 notifies the notification unit 123 of the success of the second process. When the second process fails, the second erasing unit 122 notifies the notification unit 123 of the failure of the second process.

The notification unit 123 notifies the host 2 of at least one of the success of the first process, the failure of the first process, the success of the second process, or the failure of the second process via the host I/F 11. More specifically, when the first erasing unit 121 notifies of the success of the first process, the notification unit 123 notifies the host 2 that the first encryption key generation information 51A in the first nonvolatile memory 5 is erased.

When the first erasing unit 121 notifies of the failure of the first process, the notification unit 123 notifies the host 2 that the first encryption key generation information 51A is not erased.

When the second erasing unit 122 notifies of the success of the second process, the notification unit 123 notifies the host 2 that the second encryption key generation information 141A in the second nonvolatile memory 14 is erased.

When the second erasing unit 122 notifies of the failure of the second process, the notification unit 123 notifies the host 2 that the second encryption key generation information 141A in the second nonvolatile memory 14 is not erased.

For example, in the second embodiment, after the first cryptographic erase command is transmitted to the storage device 3, and the host 2 is notified that the first encryption key generation information 51A has not been successfully erased, the host 2 may then transmit the second cryptographic erase command to the storage device 3. Accordingly, when the first encryption key generation information 51A is not erased, the host 2 can make an additional request to erase the second encryption key generation information 141A.

Similarly, if the user determines to discard the storage device 3 without any further reuse, the host 2 may transmit the second cryptographic erase command to the storage device 3 without first transmitting the first cryptographic erase command. That is, when the storage device 3 is to be entirely discarded, the second process can be performed without performing or even attempting the first process.

When the second process succeeds, the second encryption key generation information 141A is lost, and thus the storage device 3 cannot be used again. However, when the storage device 3 is to be discarded, no problem occurs due to the loss of the second encryption key generation information 141A.

As such, the host 2 (or more particularly the user using the host 2) can selectively use the first cryptographic erase command and the second cryptographic erase command according to a state or a usage status of the storage device 3.

Figure 9:
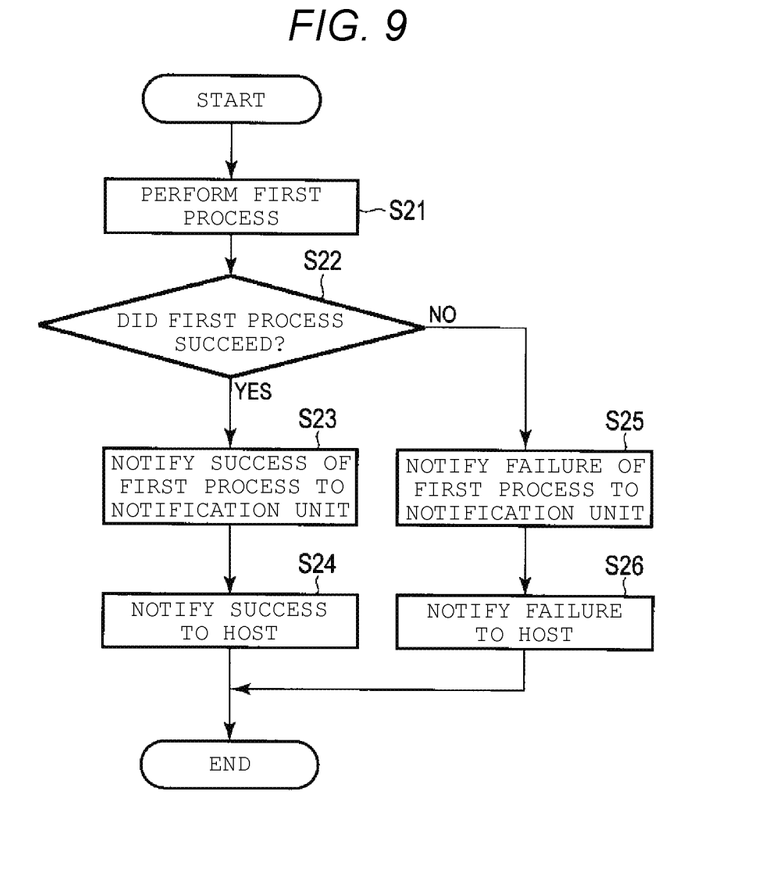
FIG. 9 is a flowchart of a second cryptographic erase process related to the first nonvolatile memory as executed by a processor in a storage device according to a second embodiment.

FIG. 9 is a flowchart illustrating an example of a procedure of a second cryptographic erase process in relation to the first nonvolatile memory 5 executed by the CPU 17 in the storage device 3 according to the second embodiment.

When the cryptographic erase is requested in relation to the first nonvolatile memory 5 (START), the first erasing unit 121 performs the first process (S21). Then, the first erasing unit 121 determines whether the first process succeeds (S22).

When the first process succeeds (YES in S22), the first erasing unit 121 notifies the notification unit 123 of the success of the first process (S23). According to this notification, the notification unit 123 notifies the host 2 that the erasure of the first encryption key generation information 51A succeeds (S24), and the second cryptographic erase process of FIG. 9 ends (END).

When the first process fails (NO in S22), the first erasing unit 121 notifies the notification unit 123 of the failure of the first process (S25). According to this notification, the notification unit 123 notifies the host 2 that the erasure of the first encryption key generation information 51A failed (S26), the second cryptographic erase process of FIG. 9 ends (END).

Figure 10:
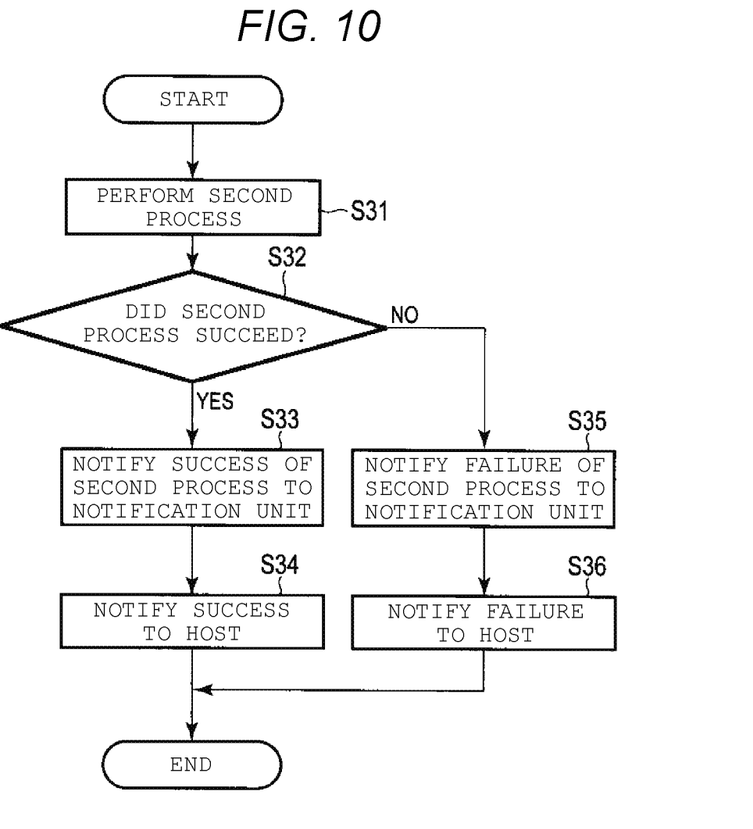
FIG. 10 is a flowchart of a third cryptographic erase process related to the second nonvolatile memory as executed by a processor in a storage device according to the second embodiment.

FIG. 10 is a flowchart illustrating an example of a procedure of a third cryptographic erase process in relation to the second nonvolatile memory 14 executed by the CPU 17 in the storage device 3 according to the second embodiment.

When the cryptographic erase is requested in relation to the second nonvolatile memory 14 (START), the second erasing unit 122 performs the second process (S31). Then, the second erasing unit 122 determines whether the second process succeeds (S32).

When the second process succeeds (YES in S32), the second erasing unit 122 notifies the notification unit 123 of the success of the second process (S33). According to this notification, the notification unit 123 notifies the host 2 that the erasure of the second encryption key generation information 141A succeeds (S34), and the third cryptographic erase process of FIG. 10 ends (END).

When the second process fails (NO in S32), the second erasing unit 122 notifies the notification unit 123 of the failure of the second process (S35). According to this notification, the notification unit 123 notifies the host 2 that the erasure of the second encryption key generation information 141A failed (S36), and the third cryptographic erase process of FIG. 10 ends (END).

According to the second cryptographic erase process illustrated in FIG. 9 and the third cryptographic erase process illustrated in FIG. 10, as described above, the CPU 17 performs the first process based on a specific request for cryptographic erase in relation to the first nonvolatile memory 5 from the host 2. The CPU 17 performs the second process based on a specific request for cryptographic erase in relation to the second nonvolatile memory 14 from the host 2.

When the host 2 is notified that the erasure of the first encryption key generation information 51A failed, the host 2 may then request the cryptographic erase in relation to the second nonvolatile memory 14 to the storage device 3. Otherwise, if the user determines to discard the storage device without further reuse, the host 2 may request the cryptographic erase in relation to the second nonvolatile memory 14 without first requesting the cryptographic erase in relation to the first nonvolatile memory 5. Accordingly, the host 2 can selectively use a request for the cryptographic erase in relation to the first nonvolatile memory 5 or a request for the cryptographic erase in relation to the second nonvolatile memory 14 according to a state or a usage status of the storage device 3.

As described above, according to the first and second embodiments, even when the storage wears out, the leakage of the data can be prevented. The first nonvolatile memory 5 includes the plurality of storage elements to which data can be written a plurality of times and stores the first encryption key generation information 51A. The second nonvolatile memory includes the plurality of storage elements of which electrical characteristics can be changed only once and stores the second encryption key generation information 141A. The CPU 17 generates an encryption key using both the first encryption key generation information 51A and the second encryption key generation information 141A in combination and then sets the generated encryption key in the encryption circuit 18. The encryption circuit 18 encrypts the data to be written to the first nonvolatile memory 5 using this encryption key and likewise decrypts the data read from the first nonvolatile memory 5 with this encryption key. When the first erasing unit 121 of the CPU 17 is requested for the encryption erase from the host 2, the first erasing unit 121 performs the first process of erasing the first encryption key generation information 51A. When the first process fails, the second erasing unit 122 of the CPU 17 performs the second process of erasing the second encryption key generation information 141A.

According to the above configuration, even when the first erasing unit 121 fails in the erasure of the first encryption key generation information 51A, the second erasing unit 122 can attempt erase of the second encryption key generation information 141A. Therefore, the encryption key can be erased or changed. Accordingly, even when the storage wears out, the leakage of the data stored in the first nonvolatile memory 5 can be prevented.

Each of the various functions described in the first and second embodiments may be implemented as hardware, such as by a dedicated circuit (processing circuit) or the like. Examples of the processing circuit includes a programmed processor such as central processing unit (CPU). The processor executes each of the described functions by executing a computer program (instruction group) stored in the memory. The processor may be a microprocessor including various electrical circuits. Other examples of the processing circuit also include a digital signal processor (DSP), an application specific integrated circuit (ASIC), a microcontroller, a controller, and other electrical circuit components. Each of the components other than the CPU described in these embodiments may also be implemented by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
   a first nonvolatile memory to which data can be written a plurality of times, the first nonvolatile memory configured to store first encryption key generation information;
   a second nonvolatile memory that includes storage elements for which electrical characteristics can be changed only once, the second nonvolatile memory configured to store second encryption key generation information; and
   a controller configured to:
      generate an encryption key using the first encryption key generation information and the second encryption key generation information in combination,
      encrypt data to be written to the first nonvolatile memory using the generated encryption key,
      decrypt data read from the first nonvolatile memory using the generated encryption key,
      attempt an erase of the first encryption key generation information in the first nonvolatile memory when a host requests an encryption erase, and
      erase the second encryption key generation information in the second nonvolatile memory if the attempt to erase first encryption key generation information fails.

2. The storage device according to claim 1, wherein the controller is configured to erase the second encryption key generation information in the second nonvolatile memory by changing the electrical characteristics of any storage elements of the second nonvolatile memory that have not been previously changed.

3. The storage device according to claim 1, wherein,
   if the attempt to erase the first encryption key generation information in the first nonvolatile memory is successful, the controller is configured to:
      generate third encryption key generation information,
      store the generated third encryption key generation information in the first nonvolatile memory, and
      generate another encryption key using the third encryption key generation information and the second encryption key generation information in combination.

4. The storage device according to claim 1, wherein the controller is further configured to notify the host of a successful attempt to erase the first encryption key generation information, a failed attempt to erase the first encryption key generation information, an erasing of the second encryption key generation information, or a failed erasing of the second encryption key generation information.

5. The storage device according to claim 1, wherein first nonvolatile memory is NAND flash memory.

6. The storage device according to claim 1, wherein the storage elements of the second nonvolatile memory are electronic fuses.

7. The storage device according to claim 1, wherein the second nonvolatile memory is a one-time programmable (OTP) memory.

8. The storage device according to claim 1, wherein the controller is further configured to:
   erase the second encryption key generation information from the second nonvolatile without first attempting to erase the first encryption key generation information from the first nonvolatile memory if the host requests an erase of the second encryption key generation information.

9. A storage device, comprising:
a first nonvolatile memory to which data can be written a plurality of times and configured to store first encryption key generation information;
a second nonvolatile memory that includes a plurality of storage elements for which electrical characteristics can be changed only once and configured to store second encryption key generation information; and
a controller configured to:
generate an encryption key by using the first encryption key generation information and the second encryption key generation information in combination,
encrypt data to be written to the first nonvolatile memory using the generated encryption key,
decrypt data read from the first nonvolatile memory using the generated encryption key,
perform a first process for erasing the first encryption key generation information when a host requests for encryption erase, and
perform a second process for erasing the second encryption key generation information if the first process fails.

10. The storage device according to claim 9, wherein, in the second process, the controller is configured to change electrical characteristics of storage elements in the second nonvolatile memory not previously changed.

11. The storage device according to claim 9, wherein, in the first process, the controller is configured to first erase the first encryption key generation information, generate third encryption key generation information, and store the third encryption key generation information in the first nonvolatile memory.

12. The storage device according to claim 9, wherein the controller is further configured to notify the host of success of the first process, failure of the first process, success of the second process, and failure of the second process.

13. The storage device according to claim 9, wherein first nonvolatile memory is NAND flash memory.

14. The storage device according to claim 9, wherein the storage elements of the second nonvolatile memory are electronic fuses.

15. The storage device according to claim 9, wherein the second nonvolatile memory is a one-time programmable (OTP) memory.

16. The storage device according to claim 9, wherein the controller is further configured to:
perform the first process when the host requests a first-type encryption erase, and
perform only the second process when the host requests a second-type encryption erase.

17. A method of controlling a storage device having a first nonvolatile memory to which data can be written a plurality of times and a second nonvolatile memory that includes a plurality of storage elements for which electrical characteristics can be changed only once, the method comprising:
generating an encryption key using first encryption key generation information, stored in the first nonvolatile memory, and the second encryption key generation information, stored in the second nonvolatile memory, in combination;
encrypting data to be written to the first nonvolatile memory using the generated encryption key;
decrypting data read from the first nonvolatile memory using the generated encryption key;
attempting an erasing of the first encryption key generation information from the first nonvolatile memory when a host requests an encryption erase, and
attempting an erasing of the second encryption key generation information from the second nonvolatile memory if the attempt to erases the first encryption key generation information from the first nonvolatile memory fails.

18. The method according to claim 17, wherein the erasing of the second encryption key generation information from the second nonvolatile memory is performed by changing the electrical characteristics of any storage elements of the second nonvolatile memory that have not been previously changed.

19. The method according to claim 17, wherein the first nonvolatile memory is NAND flash memory.

20. The method according to claim 17, wherein the storage elements of the second nonvolatile memory are electronic fuses.

* * * * *